United States Patent
Usami et al.

(10) Patent No.: US 7,562,731 B2
(45) Date of Patent: Jul. 21, 2009

(54) ELECTRIC POWER GENERATION SYSTEM FOR VEHICLE

(75) Inventors: Hiroyuki Usami, Kariya (JP); Tetsuro Kikuchi, Nishio (JP); Akira Kato, Kani (JP); Hisayoshi Oshima, Oobu (JP)

(73) Assignee: DENSO CORPORATION, Kariya (JP)

( * ) Notice: Subject to any disclaimer, the term of this patent is extended or adjusted under 35 U.S.C. 154(b) by 486 days.

(21) Appl. No.: 11/345,431

(22) Filed: Feb. 2, 2006

(65) Prior Publication Data

US 2006/0191727 A1  Aug. 31, 2006

(30) Foreign Application Priority Data

Feb. 8, 2005  (JP)  ............... 2005-032069

(51) Int. Cl.
*H01M 8/04* (2006.01)
*F02B 43/08* (2006.01)

(52) U.S. Cl. .................. 180/65.275; 903/908; 903/943; 903/944; 429/34; 429/35; 429/38; 429/39; 429/12

(58) Field of Classification Search ............... 180/65.2; 903/908, 943, 944; 429/34, 35, 38, 39
See application file for complete search history.

(56) References Cited

U.S. PATENT DOCUMENTS

| | | | | |
|---|---|---|---|---|
| 4,530,034 A * | 7/1985 | Kawarada | ............... | 362/9 |
| 5,808,448 A * | 9/1998 | Naito | ............... | 322/13 |
| 6,502,533 B1 * | 1/2003 | Meacham | ............... | 123/3 |
| 2003/0168024 A1 * | 9/2003 | Qian et al. | ............... | 123/3 |
| 2004/0076860 A1 * | 4/2004 | Aso | ............... | 429/23 |
| 2004/0110046 A1 * | 6/2004 | Pan et al. | ............... | 429/22 |
| 2005/0008911 A1 * | 1/2005 | Kaye | ............... | 429/26 |
| 2005/0048345 A1 * | 3/2005 | Meacham | ............... | 429/34 |
| 2005/0112417 A1 * | 5/2005 | Oshima et al. | ............... | 429/12 |
| 2005/0131602 A1 | 6/2005 | Souda | | |
| 2006/0166045 A1 * | 7/2006 | Ryoichi | ............... | 429/9 |
| 2006/0170390 A1 * | 8/2006 | Kikuchi et al. | ............... | 320/101 |

(Continued)

FOREIGN PATENT DOCUMENTS

JP  59-114108  7/1984

(Continued)

OTHER PUBLICATIONS

U.S. Appl. No. 11/332,391, filed Jan. 17, 2006, Kikuchi et al.

*Primary Examiner*—Christopher P Ellis
*Assistant Examiner*—Jacob Meyer
(74) *Attorney, Agent, or Firm*—Oliff & Berridge, PLC

(57) ABSTRACT

An electric power generation system is mounted on a vehicle having a secondary battery, an electric load, and an internal combustion engine as a driving source consuming gasoline in a mixed fuel which mainly consists of the gasoline and ethanol. The electric power generation system has a fuel cell for generating electric power by electric chemical reaction and a fuel storage unit having an ethanol selection permeable membrane for separating the ethanol from the mixed fuel involving the ethanol and gasoline. On satisfying a given condition, the fuel cell receives the ethanol from the permeable membrane and initiates the generation of electric power, and supplies the generated electric power to at least one of the secondary battery and the electric load.

15 Claims, 11 Drawing Sheets

U.S. PATENT DOCUMENTS

| | | | |
|---|---|---|---|
| 2006/0191727 A1* | 8/2006 | Usami et al. | 180/65.2 |
| 2007/0128494 A1* | 6/2007 | Zhamu et al. | 429/35 |
| 2008/0277174 A1* | 11/2008 | Grabbe | 180/65.2 |

FOREIGN PATENT DOCUMENTS

| | | |
|---|---|---|
| JP | A 10-70843 | 3/1998 |
| JP | A 2001-231108 | 8/2001 |
| JP | A 2002-209301 | 7/2002 |
| JP | A 2003-184666 | 7/2003 |
| JP | A 2004-106608 | 4/2004 |
| JP | A 2004-168263 | 6/2004 |
| JP | A 2005-158335 | 6/2005 |
| JP | A 2005-172662 | 6/2005 |

* cited by examiner

ELECTRIC POWER GENERATION SYSTEM FOR VEHICLE

CROSS-REFERENCE TO RELATED APPLICATIONS

This application is related to and claims priority from Japanese Patent Application No. 2005-32069 filed on Feb. 8, 2005, the contents of which are hereby incorporated by reference.

BACKGROUND OF THE INVENTION

1. Field of the Invention

The present invention relates to an electric power generation system, to be mounted on a vehicle, equipped with a fuel cell capable of generating an electric power using fuel such as ethanol separated from mixed fuel for an internal combustion engine.

2. Description of the Related Art

Recently, a growing number of auxiliary apparatus or devices mounted on a vehicle and of functions thereof has increased the amount of current power consumption or a dark current while the vehicle is in idle or stops. This introduces a possibility of discharging a battery installed in a vehicle. In general, a built-in battery of a vehicle self-discharges while an engine of the vehicle is stopped and the amount of the charged electric power is decreased gradually. A vehicle which does not run for a long time causes a remarkable voltage loss of the battery.

This phenomenon further decreases the capacity of the secondary battery because the balance between the charging and discharging is affected by the increase or change of electric load of the vehicle during driving.

In general, the vehicle equipped with an internal combustion engine as a driving power source can start the internal combustion engine by an electric power supplied from a battery. If an excess of discharging occurs in the battery, it becomes difficult to start the internal combustion engine. In order to avoid this phenomenon, there is a method to increase the capacity of the battery. However, this conventional manner introduces the limitation caused by increasing a weight and volume of the battery.

For example, various conventional techniques (1) to (4) have been disclosed in order to solve the above conventional drawbacks.

(1) Japanese laid open publication No. 2004-168263 has disclosed a manner to detect an excess discharging of a battery in advance, and to halt the supply of electric power to various devices in which a dark current flows.

(2) Japanese laid open publication No. 2002-209301 has disclosed a manner to charge an electric power of one battery to the other battery in a vehicle equipped with a plurality of batteries.

(3) Japanese laid open publication No. H10-070843 has disclosed an additional switching device for electrically interrupting the electric path between a battery and auxiliary devices during the long stop of a vehicle engine for transportation thereof.

(4) Japanese laid open publication No. S59-114108 has disclosed a vehicle equipped with a solar cell, the electric power generated in the solar cell can drive an air conditioner for cleaning the air in a compartment of the vehicle during stopping and also disclosed a configuration to charge residual electric power of the solar cell into a battery such as a secondary battery.

However, the conventional technique (1) described above has still a drawback to discharge the electric power accumulated in the battery at the stopping of the electric power to the various devices. The conventional technique (2) above also has a drawback to limit the use of the feature only for a hybrid type vehicle (HV) driven by both electric power and internal combustion engine. The conventional technique (3) has still a drawback to operate the switch to interrupt the electric path for transportation by manual and a drawback to eliminate information stored in a memory during transportation. The conventional technique (4) also has a drawback of a difficulty to charge the battery when the vehicle is in a garage without sunshine.

Although it is possible to adopt another technique using a fuel cell system that has recently been available in which an electric power is generated during the stop of a vehicle and a battery is charged by the generated electric power, it still involves a drawback in that it has to get and keep hydrogen as a fuel for the fuel cell system.

SUMMARY OF THE INVENTION

The present invention has been made in consideration of those drawbacks of the prior art described above. An object of the present invention is to provide an electric power generation system equipped with a fuel cell capable of keeping fuel for the fuel cell, to be mounted on a vehicle having an internal combustion engine as a driving source.

An aspect of the present invention is an electric power generation system to be mounted on a vehicle with an internal combustion engine as a driving source. The internal combustion engine consumes a vehicle fuel obtained from a first fuel involving one of alcohol and ether. The electric power generation system has separation means and a fuel cell. The separation means is configured to separate a second fuel from the first fuel.

The fuel cell is configured to generate electric power by electric chemical reaction between the second fuel and an oxidant. The electric power generation system has a fuel cell unit having a fuel storage unit as the separation means and the fuel cell. In the fuel storage unit, the second fuel is separated from the first fuel and supplied to the fuel cell on satisfying a given condition. The fuel cell is configured to generate electric power by electric chemical reaction between the second fuel and an oxidant.

BRIEF DESCRIPTION OF THE DRAWINGS

For a better understanding of the present invention and to show how the same may be carried out, there will now be described by way of example only, specific embodiments and methods according to the present invention with reference to the present invention.

DETAILED DESCRIPTION OF THE PREFERRED EMBODIMENTS

Figure 1:
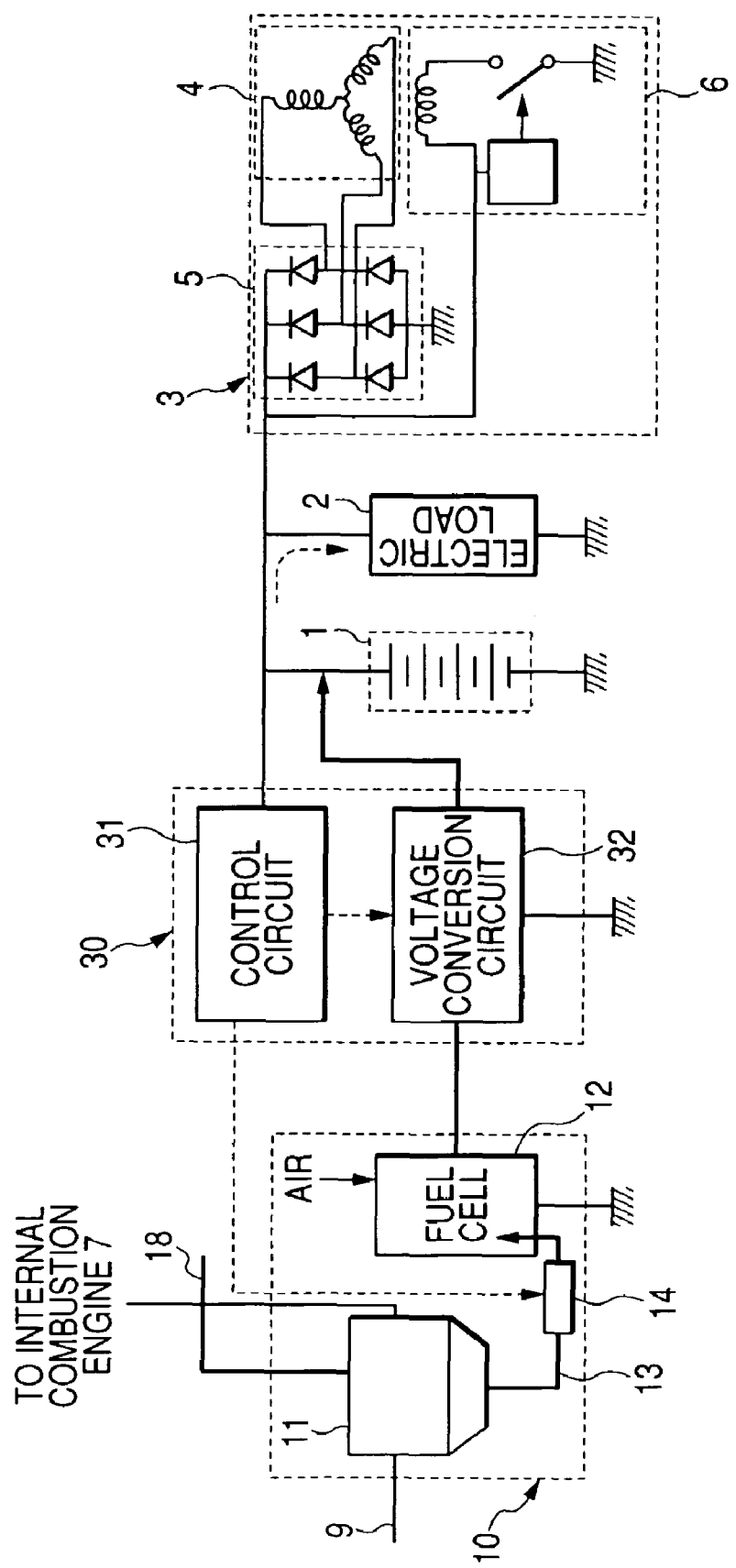
FIG. 1 is a schematic diagram mainly showing the entire configuration of an electric power generation system as a secondary battery charging system according to a first embodiment of the present invention.

Hereinafter, various embodiments of the present invention will be described with reference to the accompanying drawings. In the following description of the various embodiments, like reference characters or numerals designate like or equivalent component parts throughout the several views.

First Embodiment

A description will now be given of the electric power generation system for vehicle according to the first embodiment of the present invention.

Figure 2:
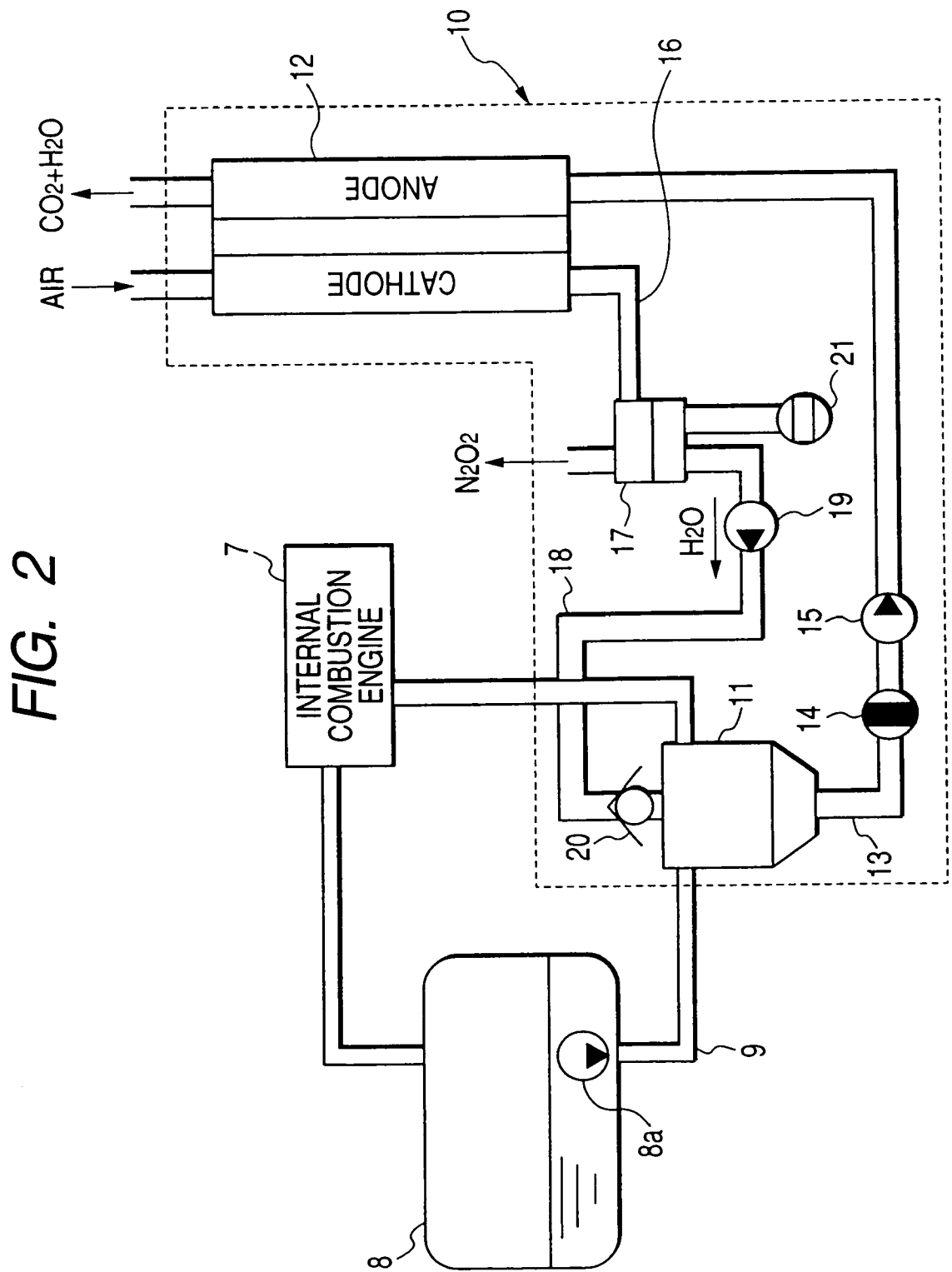
FIG. 2 is a schematic diagram mainly showing an internal combustion engine, a fuel storage unit for vehicle, and a fuel cell unit that is installed in the electric power generation system shown in FIG. 1.

FIG. 1 is a schematic diagram mainly showing the entire configuration of the electric power generation system as a secondary battery charging system according to the first embodiment. FIG. 2 is a schematic diagram mainly showing an internal combustion engine 7, a fuel storage unit 8 for vehicle, and a fuel cell unit 10 that is installed in the electric power generation system shown in FIG. 1.

The vehicle is equipped with the electric power generation system of the first embodiment shown in FIG. 1 and the internal combustion engine 7 shown in FIG. 2 as a driving power source. The vehicle drives by the internal combustion engine 7. The internal combustion engine 7 is a gasoline engine or a diesel engine as a driving power source for vehicle. The secondary battery charging system as the electric power generation system has a secondary battery 1, an electric power generator 3, the fuel cell unit 10, a control section 30, and other components. The electric power generation system, that is, the secondary battery charging system of the first embodiment may be applied to the vehicle equipped with the internal combustion engine 7.

The secondary battery 1 is charged by or accumulates an electric power generated in the electric power generator 3 during the operation of the internal combustion engine 7 (see FIG. 2). The secondary battery 1 supplies the accumulated electric power to various kinds of built-in electric devices (as the electric load) installed in the vehicle.

The secondary battery 1 is so configured to supply the electric power to a starter (not shown) for use in a start-up of the internal combustion engine.

For example, the built-in devices installed in the vehicle are a timer, a remote controlled door locking switch, and others. The electric load 2 consumes the electric power all the time including the time period in which the vehicle does not run.

During the operation of the internal combustion engine 7, the electric power generator 3 supplies the generated electric power to the built-in devices, and on the other hand during the halt of the internal combustion engine 7, the secondary battery 1 supplies the accumulated electric power to the electric load 2.

The electric power generator 3 comprises an alternator 4, a rectifier 5, and a regulator 6. The alternator 4 (or AC dynamo) operates by the internal combustion engine 7 and generates and outputs an AC voltage as the electric power. The rectifier 5 rectifies the AC voltage generated by the alternator 4 in order to generate a rectified voltage and supplies the rectified voltage as Direct Current (D.C.) voltage to the secondary battery 2 and the regulator 6. The regulator 6 controls the output of the alternator 4 so that the magnitude of the AC voltage provided from the alternator 4 becomes not more than a predetermined voltage.

The electric power generation system as the secondary battery charging system is equipped with the fuel cell unit 10 shown in FIG. 1. The fuel cell unit 10 has the fuel storage unit 11 and a fuel cell 12. The fuel cell 12 is a direct alcohol fuel cell (DAFC) consuming ethanol as a fuel. The fuel storage unit 8 stores an ethanol mixed gasoline. The ethanol mixed gasoline is supplied from the fuel storage unit 8 for vehicle to the fuel storage unit 11 in the fuel cell unit 10. The ethanol mixed gasoline stored in the fuel storage unit 8 corresponds to the first fuel according to the present invention.

The fuel storage unit 11 in the fuel cell unit 10 separates liquid ethanol (as second fuel) and gasoline (as vehicle fuel) from the ethanol mixed gasoline (as first fuel), accumulates, respectively, the liquid ethanol and the gasoline extracted from the ethanol mixed gasoline, supplies the liquid ethanol and the gasoline to the fuel cell 12 and the internal combustion engine 7, respectively. The ethanol supplied form the fuel storage unit 11 corresponds to the second fuel according to the present invention.

The fuel cell 12 is a solid polymer electrolyte (SPE) fuel cell or a polymer electrolyte fuel cell (PEFC). Because the SPE fuel cell is capable of operating at a normal temperature, the SPE fuel cell may be easily used during the period in which a vehicle does not run.

The fuel cell 12 generates the electric power. The generated electric power is charged in the secondary battery 1 during the time period at which the internal combustion engine 7 does not operate (see FIG. 2). The magnitude of the electric power generated by the fuel cell 12 is approximately 0.6 watts, where an electromotive force of the secondary battery 1 is 12 Volts, and a current consumption of the electric load 2 is approximately 50 mA. In the embodiment of the present invention, the fuel cell 12 generates the electric power of approximately 10 watts, for example, and charges the secondary battery 1 in order to recover the voltage of the secondary battery 1 rapidly.

As shown in FIG. 2, the ethanol mixed gasoline as the first fuel stored in a fuel storage unit 8 for vehicle is supplied to the internal combustion engine 7 through the fuel storage unit 11. A fuel pump 8a is mounted in the fuel storage unit 8 for vehicle. The fuel pump 8a supplies forcedly the ethanol mixed gasoline as the first fuel from the fuel storage unit 8 for vehicle to the fuel storage unit 11. In the embodiments of the present invention, the internal combustion engine 7 is a gasoline engine consuming gasoline as the vehicle fuel. So, the fuel storage unit 8 for vehicle stores the ethanol mixed gasoline involving ethanol of approximate 10% in gasoline.

A fuel storage unit 11 in the fuel cell unit 10 is arranged at the middle of a fuel supply channel 9 through which the ethanol mixed gasoline is supplied from the fuel storage unit 8 for vehicle to the internal combustion engine. The manner of separating the ethanol from the ethanol mixed gasoline by the fuel storage unit 11 will be described later. The fuel storage unit 11 corresponds to a separation means of the present invention.

Figure 3:
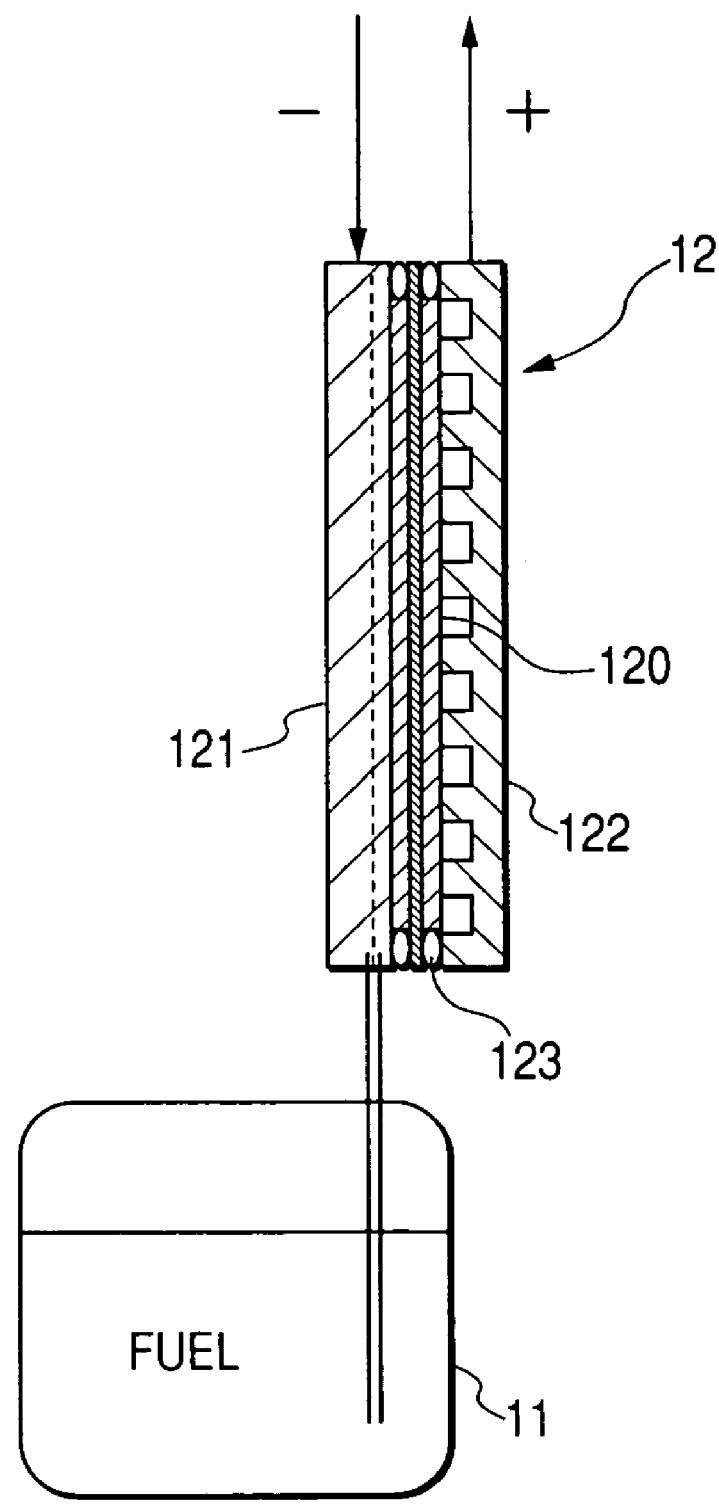
FIG. 3 is a schematic diagram showing a main configuration of a fuel cell installed in the fuel cell unit shown in FIG. 2.

FIG. 3 is a schematic diagram showing a main configuration of a fuel cell 12 installed in the fuel cell unit shown in FIG. 2.

The fuel cell 12 is composed of a membrane electrode assembly (MEA) 120 and a pair of separators 121 and 122. In the MEA 120, electrodes are formed at both sides of the membrane. In the fuel cell 12, a pair of separators 121 and 122 supports the MEA 120. The separator 121 is formed at an anode electrode side of the MEA 120. The separator 122 is formed at a cathode electrode side of the MEA 120.

The membrane is a proton conductive polymer electrolyte such as Nafion® of DUPONT (perfluorosulfonic acid polymer).

The fuel cell 12 mounted on the secondary battery charging system of the first embodiment is a single layer structure. The membrane in the MEA 120 is sealed with the sealing member 123.

A pair of the separators 121 and 122 is composed of a carbon or a conductive material of a plate shape. As shown in FIG. 2, a groove designated by a dotted line is formed in the separator 121 at the anode electrode side. Through the groove, ethanol is supplied as fuel from the fuel storage unit 11. A groove (not shown) is also formed in the separator 122 at the cathode electrode side, through which air is supplied to the membrane.

Because the fuel cell 12 generates the electrical power of only 10 watts, it is not necessary to supply air to the membrane, that is, air is automatically supplied in natural circulation of air to the cathode separator 122 side.

Reverting to FIG. 2, another fuel supply channel 13 is formed between the fuel storage unit 11 and the fuel cell 12. Through the fuel supply channel 13 the ethanol separated and stored in the fuel storage unit 11 is supplied to the fuel cell 12. A valve 14 and the ethanol supply pump 15 are mounted on the fuel supply channel 13. The valve 14 opens and closes the fuel supply channel 13. The ethanol supply pump 15 forcedly supplies the ethanol from the fuel storage unit 11 to the fuel cell 12. During the usual operation, the valve 14 closes the fuel supply channel 13. When the valve 14 opens and the ethanol supply pump 15 starts the operation, the fuel cell 12 initiates the generation of the electrical power. The ethanol stored in the fuel storage unit 11 is supplied to the fuel cell 12 through the fuel supply channel 13 by the ethanol supply pump 15. In the fuel cell 12, the electric chemical reaction of hydrogen and oxygen starts and proceeds and the electric power is thereby generated. In the electric chemical reaction, the hydrogen is the fuel generated from the supplied ethanol and the oxygen is provided from the air as oxidant.

An exhaust gas channel 16 is jointed to the cathode end of the fuel cell 12, through which air exhaust gas involving remaining oxygen that has not been used in the electric chemical reaction in the fuel cell 12 is exhausted. Because the air exhaust gas involves product water generated in the electric chemical reaction, a liquid separator 17 is mounted on the exhaust gas channel 16.

The water component in the liquid separator 17 is supplied to the fuel storage unit 11 through the water supply channel 18. The water supply channel 18 is equipped with a water supply pump 19 for providing the water forcedly to the fuel storage unit 11 and a check valve 20 (or delivery valve) for preventing gasoline flowing backward to the water supply channel 18. The liquid separator 17 is equipped with an exhaust valve 21 by which the water accumulated in the liquid separator 17 is exhausted to the outside thereof.

Next, a description will now be given of the manner of ethanol separation from the ethanol mixed gasoline stored in the fuel storage unit 11.

Figure 4:
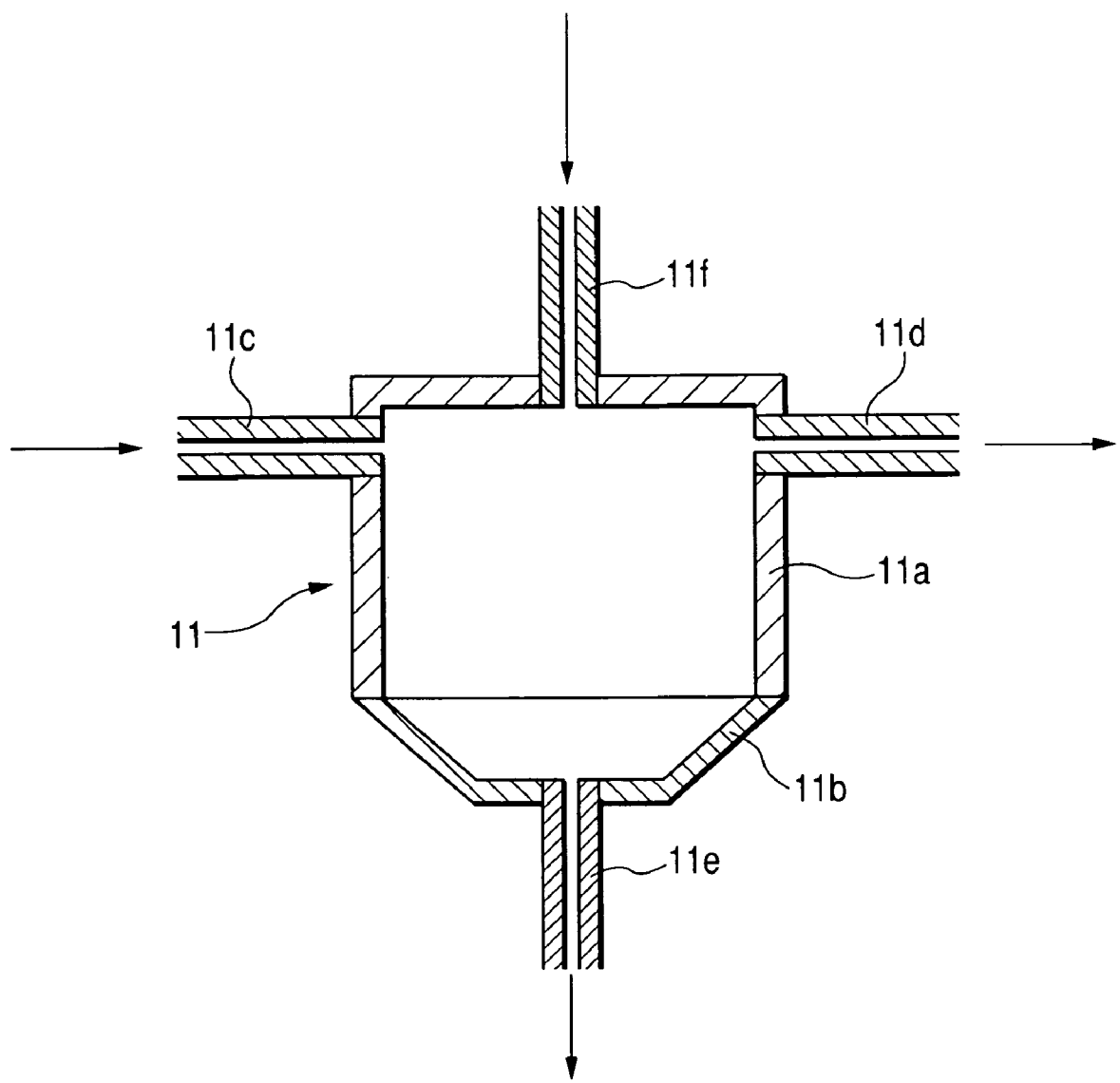
FIG. 4 is a sectional diagram showing a configuration of a fuel storage unit installed in the electric power generation system according to the first embodiment.

FIG. 4 is a sectional diagram showing a configuration of the fuel storage unit 11 installed in the electric power generation system according to the first embodiment.

The fuel storage unit 11 comprises a first body part 11*a* as upper end and a second body part 11*b* as bottom end. The first body part 11*a* has a cylindrical shape. The second body part 11*b* of the fuel storage unit 11 has a funnel shape in which the diameter thereof is gradually reduced with a bottom end. The second body part 11*b* corresponds to a funnel part of the present invention.

It is desirable that a volume ratio between the fuel storage unit 11 and the second body part 11*b* is lower than a volume ratio between the ethanol mixed gasoline and the ethanol involved in the ethanol mixed gasoline. That is, the upper surface of the ethanol component separated from the ethanol mixed gasoline is positioned at the boundary of the first body part 11*a* and the second body part 11*b* or is positioned at a slightly upper part than the boundary. This prevents to increase the size of the second body part 11*b* of a funnel shape more than necessary.

As described above, the fuel storage unit 11 is mounted on the middle node of the fuel supply channel 9 through which gasoline is supplied to the internal combustion engine 7 from the fuel storage unit 11.

The first body part 11*a* has a fuel inlet 11*c* and a gasoline outlet 11*d*. The fuel inlet 11*c* is joined to the fuel storage unit 8 for vehicle (as upstream end) through the fuel supply channel 9. The gasoline outlet 11*d* is joined to the internal combustion 7 (as downstream end) through the fuel supply channel 9. An ethanol exhaust outlet 11*e* is formed at the bottom of the second body part 11*b*. The ethanol exhaust outlet 11*e* is joined to the fuel supply channel 13.

The fuel storage unit 11 is configured to separate the ethanol component from the ethanol mixed gasoline based on the phenomenon of phase separation with water A water inlet 11*f* is formed and arranged at the uppermost part of the first body part 11*a* in the fuel storage unit 11. The water inlet 11*f* is joined to the water supply channel 18. The water separated by the liquid separator 17 is supplied through the water supply channel 18 to the water inlet 11*f* of the first body part 11*a* in the fuel storage unit 11.

Thus, even if the ethanol mixed gasoline supplied from the fuel storage unit 11 involves a lower ethanol in volume, the configuration of the second body part 11*b* in the fuel storage unit 11 can separate and supply the ethanol easily to the fuel cell 12.

When the product water is supplied from the liquid separator 17 to the fuel storage unit 11 under the state in which ethanol mixed gasoline is stored in the fuel storage unit 11, ethanol involved in the ethanol mixed gasoline is dissolved in the water, so that the ethanol component becomes an ethanol solution and is separated from the gasoline. Because the ethanol solution is higher in density than the gasoline, the ethanol solution is deposited or settled in the second body part 11b in the fuel storage unit 11. The ethanol solution accumulated in the bottom of the second body part 11b is supplied to the anode electrode end of the fuel cell 12 through the ethanol exhaust outlet 11e by opening the open and close valve 14 mounted on the fuel supply channel 13 and by operating the ethanol supply pump 15.

Reverting to FIG. 1, the electric power generation system as the secondary battery charging system according to the first embodiment is equipped with a control section 30.

The control section 30 comprises a control circuit 31 and a voltage conversion circuit 32. Each circuit 31 and 32 is configured to operate by the supply of the electrical power form the secondary battery 1. The control circuit 31 is realized by an available or commercially available microcomputer comprising a central processing unit (CPU), a read only memory (ROM), a random access memory (RAM), and input/output circuit (I/O). The control circuit 31 executes each calculation according to programs stored in the ROM.

The control circuit 31 detects the operating state of the internal combustion engine 7, and controls the open and close operation of the close valve 14 and the operation of the pumps 15 and 19. The control circuit 31, the open and close valve 14, and the pumps 15 and 19 correspond to a fuel supply control means of the present invention. The voltage conversion circuit 32 corresponds to the voltage conversion means of the present invention.

The voltage conversion circuit 32 boosts the electrical energy, namely the level of the voltage generated in the fuel cell 12 to a voltage level at which the secondary battery 1 can charge the electrical power.

In the first embodiment, because a level of the voltage generated by the fuel cell 12 composed of the single fuel cell is approximately 0.5 to 0.8 volts, the voltage conversion circuit 32 boosts the voltage generated in the fuel cell 12 until the voltage (for example, 12 Volts) as the electromotive force of the secondary battery 1.

Figure 5:
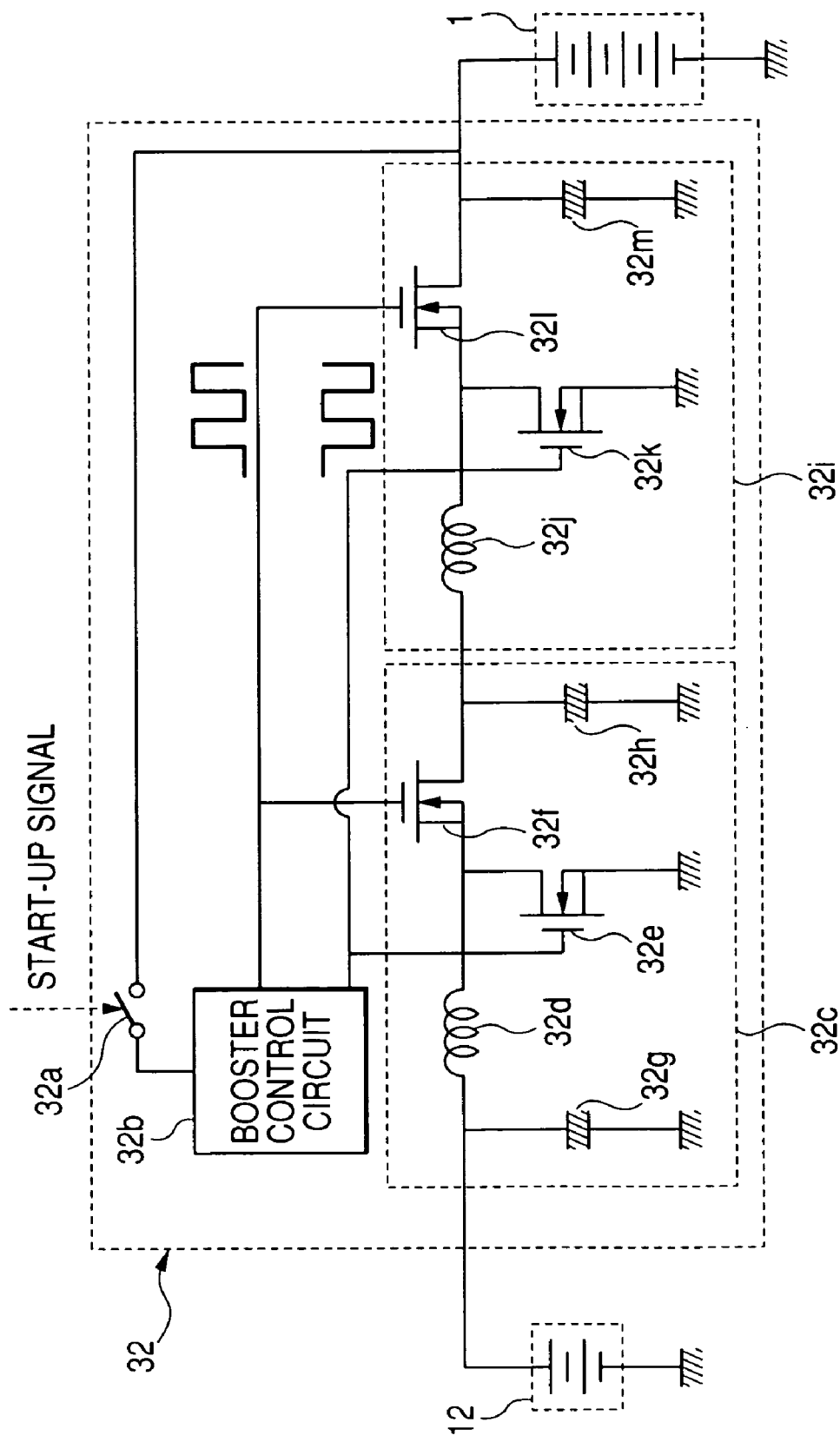
FIG. 5 is a circuit diagram of a voltage converter circuit in a control section installed in the electric power generation system according to the first embodiment.

FIG. 5 is a circuit diagram of the voltage conversion circuit 32 in the electric power generation system as the secondary battery charging system of the first embodiment. As shown in FIG. 5, the voltage conversion circuit 32 is a well known booster comprising a switch 32a, a booster controller 32b, and a DC/DC converter 32c. The switch 32a performs open and close operation according to the start-up signal transferred from the control circuit 31. The DC/DC converter 32c comprises a coil 32d, switching elements 32e and 32f such as field effect transistors (FET), and capacitances 32g and 32h.

The switching elements 32e and 32f are capable of performing ON and OFF operation by using the electrical energy accumulated in the coil 32d having a desired inductance. The capacitances 32g and 32h are capable of smoothing the voltage.

Next a description will now be given of the operation of the electric power generation circuit as the secondary battery charging system of the first embodiment.

In the initial state of the fuel storage unit 11, water is supplied to the liquid separator 17 in advance or ethanol solution of a given concentration is stored in the fuel storage unit 11 in advance because the fuel storage unit 11 performs the ethanol separation operation from the ethanol mixed gasoline using the product water supplied from the liquid separator 17.

During the operation of the internal combustion engine 7, gasoline is supplied to the internal combustion engine 7 from the fuel storage unit 8 for vehicle through the fuel storage unit 11. The remaining gasoline that has not been used by the internal combustion engine 7 is returned to the fuel storage unit 8 for vehicle.

The pressure of the gasoline is more than the atmosphere pressure because the gasoline is compressed by the fuel pump 8a. However, the gasoline cannot flow into the fuel cell 12 because the open and close valve 14 and the check valve 20 (or delivery valve) are mounted on the fuel supply channel 13 and the water supply channel 18 through which the fuel storage unit 11 is joined with the fuel cell 12.

The control circuit 31 installed in the control section 30 in the electric power generation system according to the first embodiment outputs or transfers a start-up signal, as a control signal at a desired elapsed time counted from the time at which the internal combustion engine 7 stops, to the open and close valve 14, the ethanol supply pump 15, and the water supply pump 19.

When receiving the start-up signal, the open and close valve 14 opens, and the ethanol supply pump 15 and the water supply pump 19 initiate those operation. The desired elapsed time counted is the time when the electrical energy (or capacities) charged in the secondary battery 1 becomes lower than a given level to start the internal combustion engine. For example, the desired level is 40 percentages of the fully charged state in the secondary battery. In the first embodiment, the desired elapsed time is set to forty days counted from the time at which the internal combustion engine 7 stops.

The stop of the electric power generation in the alternator 4 informs the stop of operation of the internal combustion engine 7. The stop state of the internal combustion engine 7 can be detected as the stop state of the alternator 4.

In the state in which the internal combustion engine 7 does not operate and the ethanol mixed gasoline is stored in the fuel storage unit 11, when the water obtained from the liquid separator 17 is supplied to the fuel storage unit 11 by operation the water supply pump 19, ethanol is separated from the ethanol mixed gasoline in the fuel storage unit 11.

When the open and close valve 14 then opens and the ethanol supply pump 15 initiates the operation, the ethanol separated in the fuel storage unit 11 is supplied to the fuel cell 12. The fuel cell 12 thereby generates the electric power. When the ethanol supply pump 15 stops and the open and close valve 14 closes, the fuel cell 12 halts the electric power generation if all amount of the ethanol is consumed.

By the voltage conversion circuit 32, the electric power generated in the fuel cell 12 is boosted up to the voltage for adequately charging the secondary battery 1. Therefore it is possible to prevent occurrence of the voltage drop in the secondary battery 1 even if the internal combustion engine 7 stops its operation. It is thereby possible to store and keep the desired electric power in the secondary battery 1, which adequately starts up of the operation of the internal combustion engine 7.

If the amount of the ethanol mixed gasoline stored in the fuel storage unit 8 becomes limiting, a driver for a vehicle goes to a gas station or others in order to supply the ethanol mixed gasoline into the fuel storage unit 8.

Because the ethanol is separated from the ethanol mixed gasoline and stored in the fuel storage unit 11, the driver for a vehicle only requires supplying the ethanol mixed gasoline as the first fuel into the fuel storage unit 8 for vehicle and does not require performing specific or additional handling and the maintenance for the fuel cell 12. The driver does not require adding any water to make up the loss due to the ethanol separation because the product water generated in the fuel cell 12 can be supplied to and used for the ethanol separation performed in the fuel storage unit 11 after the initiation of the electric power generation in the fuel cell 12.

Second Embodiment

Next, a description will now be given of the electric power generation system as the secondary battery charging system according to the second embodiment of the present invention.

The second embodiment shows another start-up condition that is different from the start-up condition performed in the first embodiment. Hereinafter, the different manner from the first embodiment will be explained.

The control circuit 31 in the control section 30 in the electric power generation system of the second embodiment detects a no-load voltage or open-circuit voltage of the secondary battery 1 and estimates the SOC (state of charge) of the secondary battery 1.

On halting the operation of the internal combustion engine 7, when the control circuit 31 detects that the SOC of the secondary battery 1 estimated from the open-circuit voltage of the secondary battery 1 is lower than a given voltage value, the control circuit 31 generates and outputs the start-up signal to the open and close valve 14. The given voltage value is a charging capacity necessary to restart the internal combustion engine 7. For example, it is possible to set a voltage of forty percentages of the fully charged of the secondary battery 2 as the given voltage value.

Thus, the above manner according to the second embodiment has the same effect obtained by the first embodiment.

Third Embodiment

Next, a description will now be given of the electric power generation system as the secondary battery charging system according to the third embodiment of the present invention with reference to FIG. 6.

Hereinafter, only the components and manner different from the first embodiment will be explained.

Figure 6:
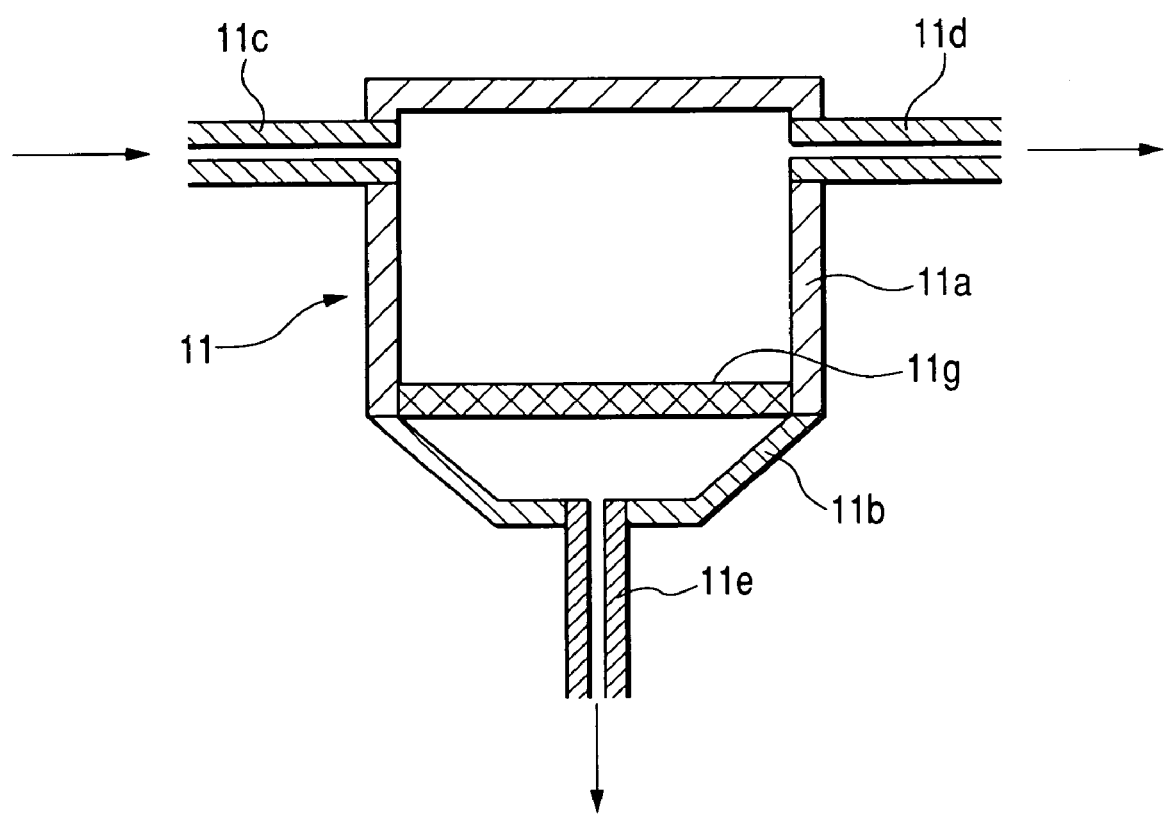
FIG. 6 is a sectional diagram showing a configuration of another fuel cell storage unit installed in the electric power generation system according to a third embodiment of the present invention.

FIG. 6 is a sectional diagram showing the configuration of another fuel cell storage unit installed in the electric power generation system according to the third embodiment of the present invention. In FIG. 6, reference character 11g designates an ethanol selection permeable membrane for separating the ethanol from the ethanol mixed gasoline. In the second embodiment, the fuel storage unit 11 is equipped with the ethanol selection permeable membrane 11g placed at the boundary between the first body part 11a and the second body part 11b. The ethanol selection permeable membrane 11g penetrates only ethanol or ethanol and water, not gasoline. For example, a porous zeolite film, a porous silica film, or a porous organic film may be used as the ethanol selection permeable membrane 11g.

When the ethanol mixed gasoline is supplied to the first body part 11a in the fuel storage unit 11 from the fuel storage unit 8 for vehicle, only the ethanol is separated from the ethanol mixed gasoline by the ethanol selection permeable membrane 11g and then moved to the second body part 11b. The ethanol separation is performed proportion to the pressure difference between both the surfaces of the permeable membrane 11g placed at the boundary of the first body part 11a and the second body part 11b and also according to the temperature difference between the both surfaces of the permeable membrane 11g.

Because the fuel pump 8a supplies forcedly the ethanol mixed gasoline from the fuel storage unit 8 to the fuel storage unit 11, the ethanol mixed gasoline has a pressure of more than the atmosphere pressure, so that an efficient ethanol separation can be performed. Furthermore, because the temperature of the ethanol mixed gasoline becomes high by the forced supply performed by the fuel pump 8a, the present embodiment performs the ethanol separation efficiently.

The fuel storage unit 11 having the ethanol selection permeable membrane 11g in the electric power generation system of the third embodiment does not require supplying water to the fuel storage unit 11 and thereby does not require the components such as the liquid separator 17, the water supply channel 18, and the water supply pump 19 in the secondary battery charging system as the electric power generation system. Therefore the third embodiment of the present invention can provide the electric power generation system with a simple configuration and the same effect.

Fourth Embodiment

Next, a description will now be given of the electric power generation system as the secondary battery charging system according to the fourth embodiment of the present invention with reference to FIG. 7.

The fourth embodiment provides a different start-up condition for the fuel cell 12 when compared with the configuration of the first embodiment.

Hereinafter, only the components and manner different from the first embodiment will be explained.

Figure 7:
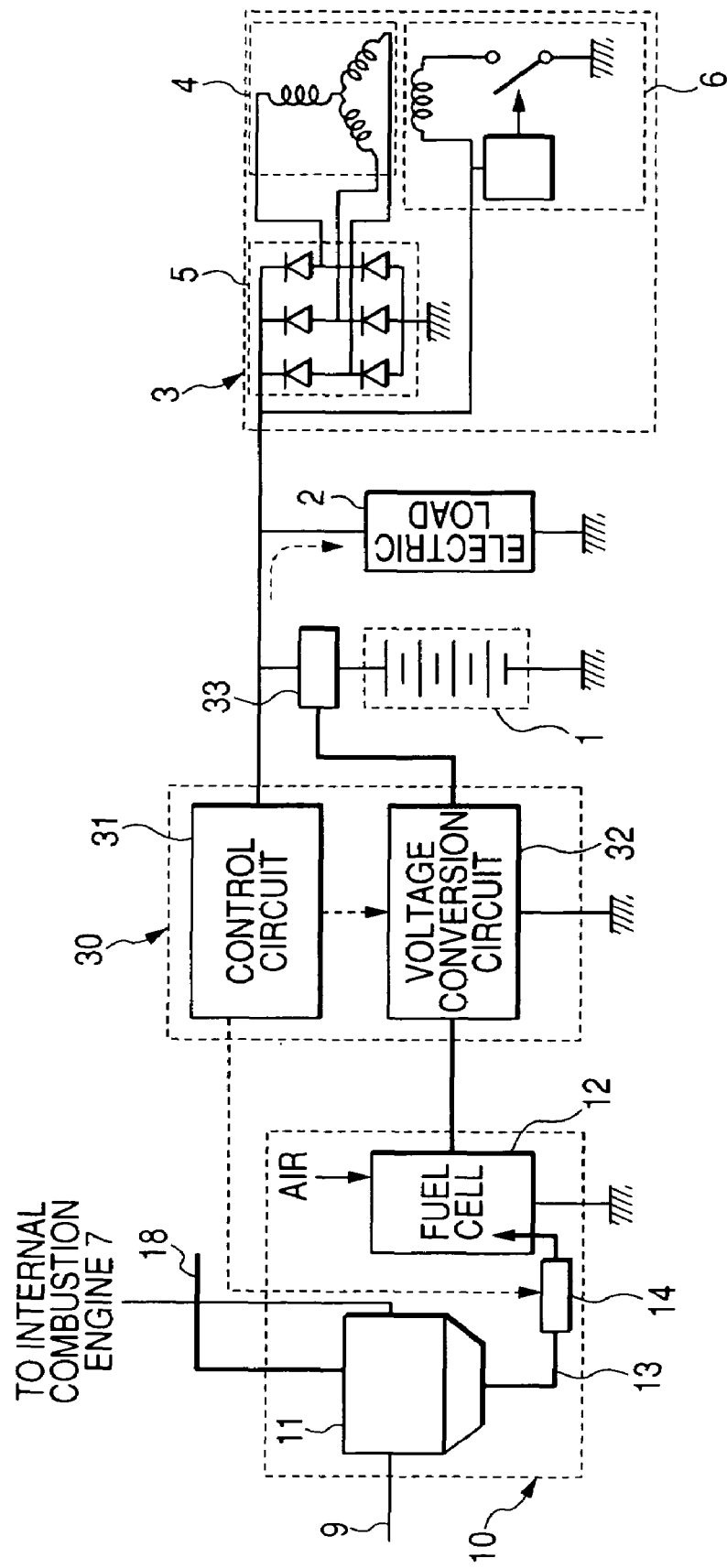
FIG. 7 is a schematic diagram showing an entire configuration of an electric power generation system or a secondary battery charging system according to a fourth embodiment of the present invention.

FIG. 7 is a schematic diagram showing the entire configuration of the electric power generation system as the secondary battery charging system according to the fourth embodiment of the present invention. As shown in FIG. 7, a current sensor 33 is installed in the secondary battery charging system. The current sensor 33 monitors the current to be supplied to the secondary battery 1 and the current flowing from the secondary battery 1. Thus, the current sensor 33 detects the magnitude of the current to/from the secondary battery 1 and its current direction.

When detecting the state in which the internal combustion engine 7 does not operate, the control circuit 31 in the controls section 30 generates and outputs the start-up signal in order to initiate the operation of the fuel cell 12 to the open and close valve 14, the ethanol supply pump 15, and the water supply pump 19.

The fuel cell 12 thereby initiates the generation of electrical power, and the electrical power generated is charged to the secondary battery 1. The current sensor 33 monitors the state of the current flow in the secondary battery 1 whether the current of the secondary battery 1 is zero or not in order to avoid an over discharging of the secondary battery 1.

The fourth embodiment has the configuration in which the secondary battery 1 is changed immediately following the halt of the operation of the internal combustion engine 7. Because it is not necessary for the secondary battery 1 to have the ability to generate the electrical power as large as possible, the generation ability of the electric power in the fuel cell 12 can be set to a least level, and it is on the contrary required for the fuel cell 12 to have a long life time.

Fifth Embodiment

A description will now be given of the electric power generation system as the secondary battery charging system according to the fifth embodiment with reference to FIG. 8.

Figure 8:
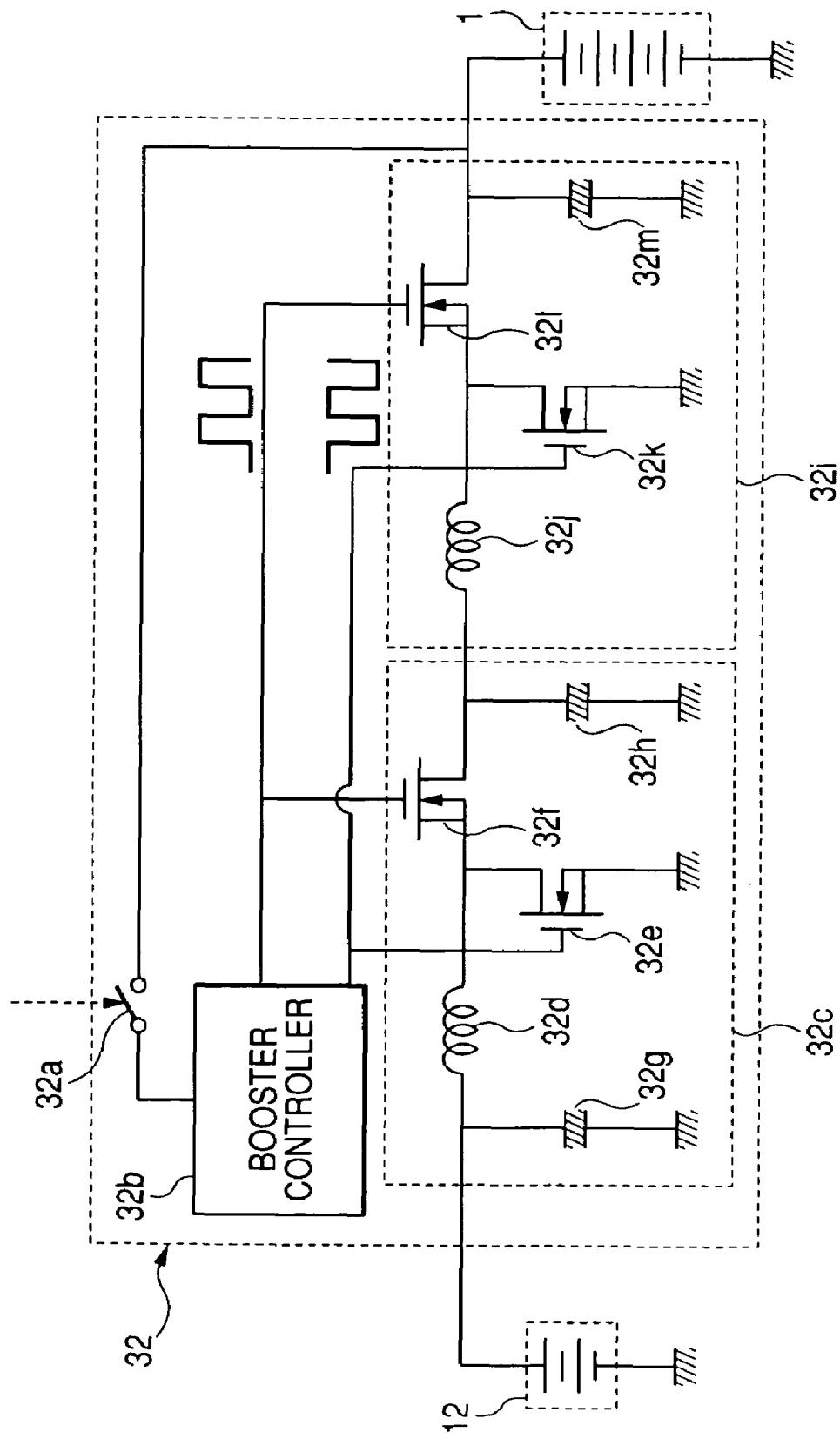
FIG. 8 is a circuit diagram of a voltage converter circuit in a control section installed in an electric power generation system or a secondary battery charging system according to the fifth embodiment.

FIG. 8 is a schematic diagram showing a configuration of voltage conversion circuits 32 in the secondary battery charging system of the fourth embodiment.

The secondary battery charging system of the fifth embodiment has the voltage conversion circuit having a different configuration when compared with that of the first embodiment. Other components of the secondary battery charging system of the fifth embodiment are the same of those of the first embodiment. Therefore the explanation for the same components is omitted here. For this reason, FIG. 8 shows the configuration of only the voltage conversion circuit 32 and does not show other components.

A plurality of the voltage conversion circuits are installed in the secondary battery charging system of the fourth embodiment. FIG. 8 shows a pair of the DC/DC converters 32c and 32i and each converter corresponds to the booster circuit of the present invention.

When the voltage of the fuel cell 12 is approximately 0.6 volts for example, the DC/DC converter 32c boosts the voltage from 0.6 volts to approximately 3.0 volts, and the DC/DC converter 32i further boosts the voltage from 3.0 volts to approximately 12.0 volts.

Thus, according to the electric power generation system as the secondary battery charging system of the fifth embodiment, the incorporation of a plurality of the DC/DC converters (or boosters) can improve the efficiency of the energy conversion.

Sixth Embodiment

A description will now be given of the electric power generation system as the secondary battery charging system according to the sixth embodiment with reference to FIG. 9.

Figure 9:
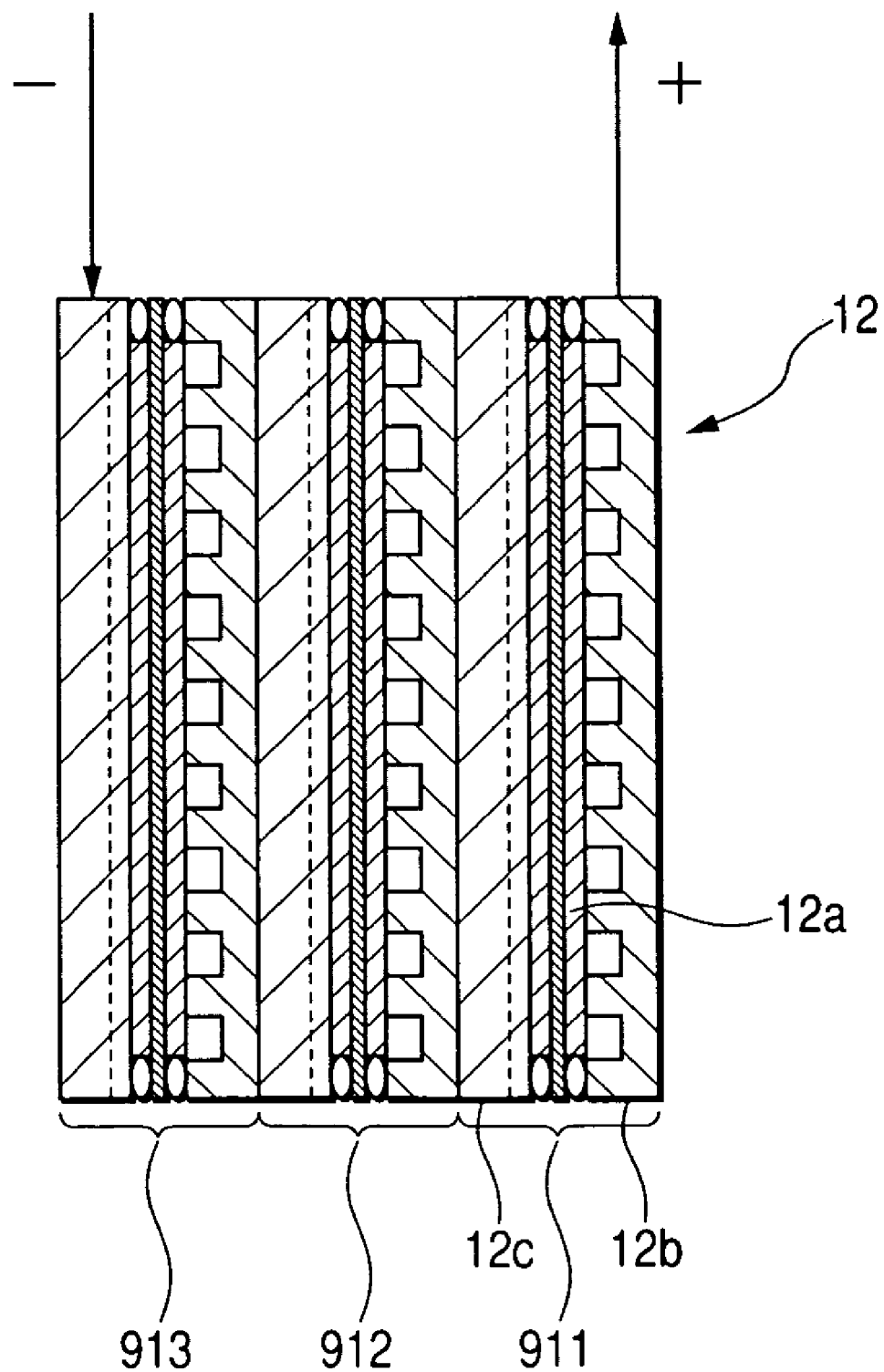
FIG. 9 is a schematic diagram showing a configuration of a fuel cell installed in an electric power generation system or a secondary battery charging system according to a sixth embodiment of the present invention.

FIG. 9 is a schematic diagram showing the fuel cell installed in the secondary battery charging system of the sixth embodiment. Other components of the secondary battery charging system of the sixth embodiment are the same of those of the first embodiment. Therefore the explanation for those is omitted here.

FIG. 9 shows the fuel cell composed of three fuel cell elements connected in series. Each fuel cell element has the same configuration of the fuel cell shown in FIG. 3.

According to the secondary battery charging system of the sixth embodiment, the three fuel cell elements 911, 912, and 913 are laminated and each of fuel cell elements 911, 912, 913 comprises a MEA 12a and a pair of the separators 12b and 12c. This configuration of a plurality of the fuel cell elements 911, 912, and 913 connected in series can increase the output voltage of the fuel cell 12.

Seventh Embodiment

A description will now be given of the electric power generation system as the secondary battery charging system according to the seventh embodiment with reference to FIG. 10.

Figure 10:
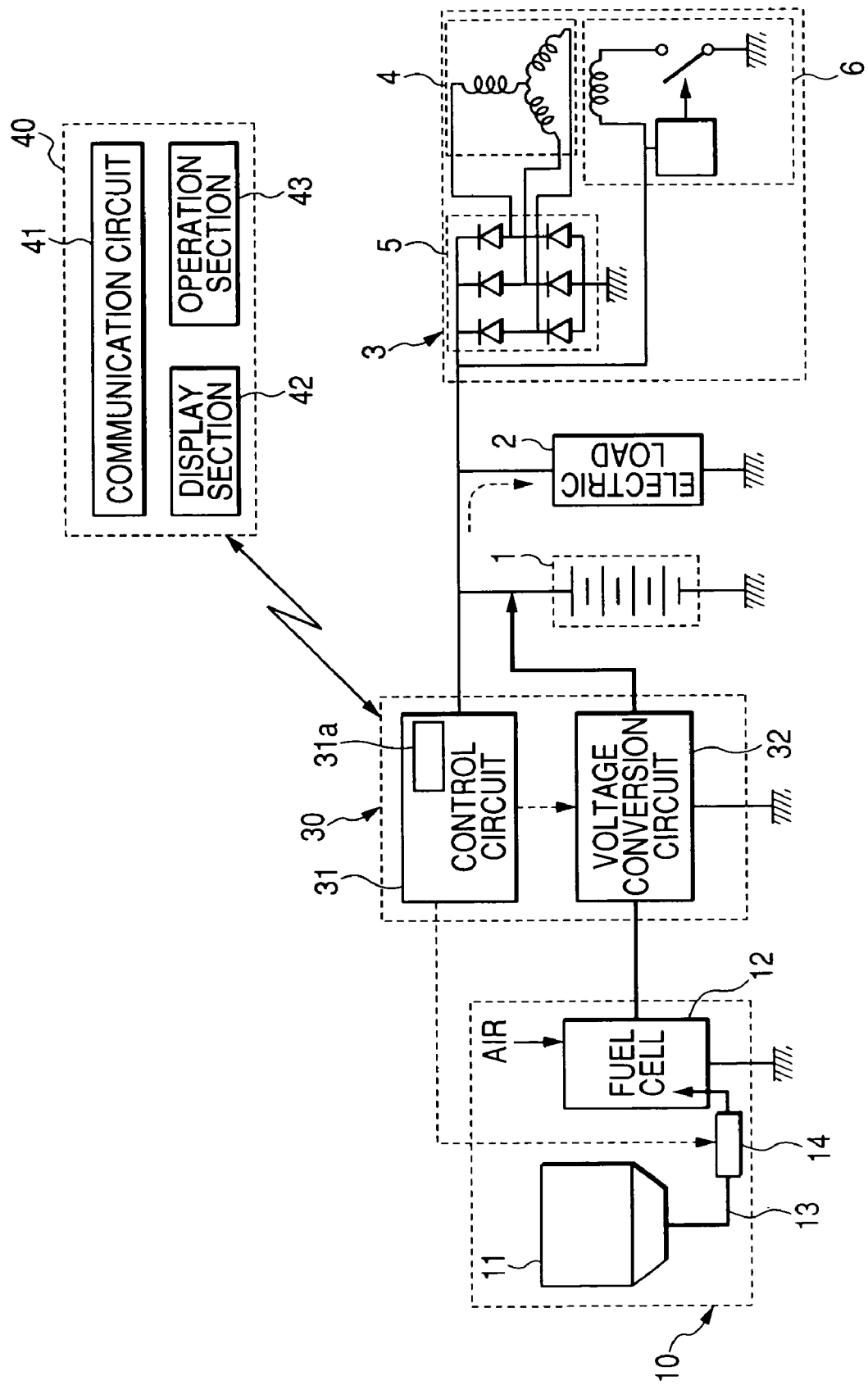
FIG. 10 is a schematic diagram showing an entire configuration of an electric power generation system or a secondary battery charging system according to a seventh embodiment of the present invention.

FIG. 10 is a schematic diagram showing an entire configuration of the electric power generation system as the secondary battery charging system of the seventh embodiment. As shown in FIG. 10, a remote control device 40 is provided at the outside of a vehicle equipped with the secondary battery charging system. The control circuit 31 is equipped with a communication circuit 31a as a first communication means through which a radio communication is performed between the remote control device 40 and the secondary battery charging system. In the seventh embodiment, the radio communication is performed between the vehicle incorporated with the secondary battery charging system and a user can use the remote control device 40.

The control circuit 31 detects the residual electrical energy of the secondary battery 1 at a desired elapsed time counted from the fallen time into the stop of the internal combustion engine 7 installed in the vehicle. When the detection result indicates that the residual electrical energy is lower than the desired least level that is necessary to start the internal combustion engine 7, the control circuit 31 transmits information regarding the residual electrical energy in the secondary battery 1 to the remote control device 40.

The control circuit 31 receives the control signal such as a start-up control signal for the fuel cell 12 transferred from the remote control device 40.

The remote control device 40 comprises a display section 42 and an operation section 43. The user watches the information displayed on the display section 42b and operates an instruction to the secondary battery charging system by the operation section 43.

The remote control device 40, the communication circuit 31a, the communication circuit 41, the display section 42, and the operation section 43 mean the external device, the display means, and the operation means according to the present invention.

When receiving the information regarding the residual amount of the electrical energy accumulated or stored in the secondary battery 1 transferred from the fuel control circuit 31, the remote control device 40 displays on the display section 42 (as a monitor) the information that indicates the necessity of charging the electrical energy into the secondary battery 1. The user watches the information displayed on the display section 42 and instructs to initiate the charging of the secondary battery 1 through the operation section 43, and transfers the start-up control signal to the secondary battery charging system through the remote control device 40. That is, the remote control device 40 transmits the start-up control signal to the control circuit 31 in order to initiate the charging operation in the fuel cell 12.

When receiving the start-up control signal transferred from the remote control device 40, the control device 31 instructs to the open and close valve 14, the ethanol supply pump 15, and the water supply pump 19 in order to initiate the generation of the electrical energy in the fuel cell 12 and also to initiate the charging of the secondary battery 1.

As described above in detail, according to the configuration of the secondary battery charging system of the seventh embodiment, it is possible to inform the necessity of the charging to the secondary battery 1 to the user which is out of the vehicle, and possible to charge the secondary battery 1 based on the user's instruction.

Although the remote control device 40 is a device out of the vehicle, the present invention is not limited by this configuration, for example, it is possible to install the remote control device 40 in the compartment of the vehicle. This configuration allows connecting the control device 40 with the control circuit 31 through electric wire.

Other Preferred Embodiments

The configurations of the embodiments described above have shown that the secondary battery 1 is charged with the electric power generated in the fuel cell 12. The present invention is not limited by those embodiments. For example, it is possible to have a configuration in which the electric power generated by the fuel cell 12 is supplied to the electric load 2 directly and the voltage conversion circuit 32 for boosting the electric power generated by the fuel cell 12 is placed between the fuel cell 12 and the electric load 2.

The above embodiments have used ethanol as liquid organic compound. The present invention is not limited by using ethanol. It is possible to use liquid organic compound included in gasoline such as methanol mixed alcohol or included in ether such as dimethyl.

Figure 11:
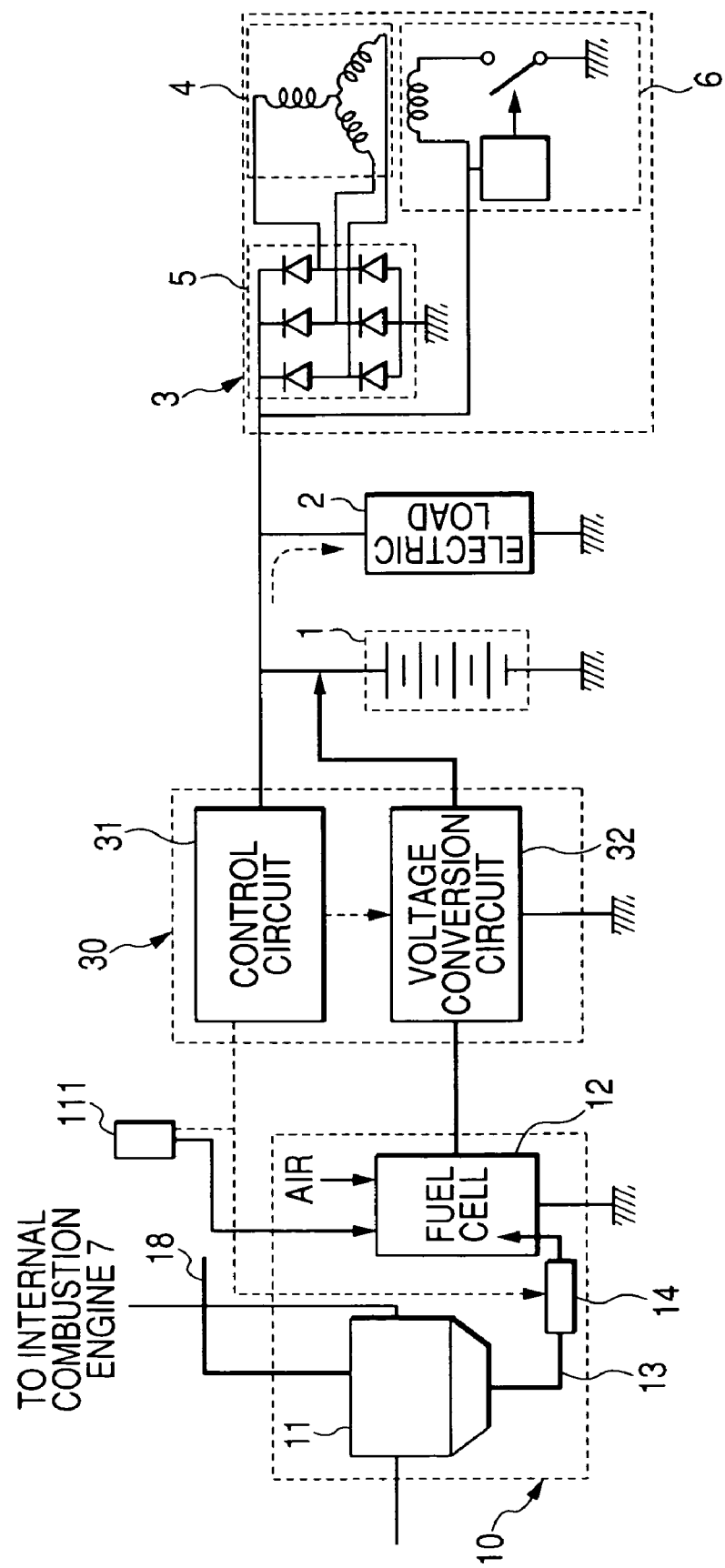
FIG. 11 is a schematic diagram showing an entire configuration of an electric power generation system as a secondary battery charging system according to another preferred embodiment of the present invention.

Furthermore, the above embodiments have shown the manner to separate ethanol from ethanol mixed gasoline. The present invention is not limited by the manner. On being empty of gasoline in the fuel storage unit 11 for vehicle under the stop of the internal combustion engine 7 for a long continuous period, it is impossible to generate the electric power by the fuel cell 12 and not to charge the secondary battery 1. In this case, as shown in FIG. 11, it is possible to add a supplemental ethanol storage unit 111 for storing ethanol and to supply ethanol to the supplemental ethanol storage unit 111.

Furthermore, the above embodiments have shown the configuration in which the ethanol selection permeable membrane for separating the ethanol from the ethanol mixed gasoline. The present invention is not limited by the configuration. It is possible to add a heater for heating the fuel storage unit 11 and to heat the heater in order to extract the ethanol from the ethanol mixed gasoline based on the difference in evaporation temperature between the ethanol and the gasoline.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An electric power generation system to be mounted on a vehicle with an internal combustion engine as a driving source, the internal combustion engine consuming a vehicle fuel obtained from a first fuel involving one of alcohol and ether, the electric power generation system comprising:
    separation means configured to separate a second fuel from the first fuel; and
    a fuel cell configured to generate electric power by electric chemical reaction between the second fuel and an oxidant, wherein
    the second fuel to be used in the fuel cell is alcohol and the separation means separates and extracts the second fuel from the first fuel by phase separation of the second fuel by adding water to the first fuel,
    the second fuel is separated by the separation means and deposited at a bottom part of the separation means and the first fuel is deposited at a upper part of the separation means over the second fuel, and
    the separation means comprises a funnel part formed at the bottom part thereof through which the second fuel is supplied to the fuel cell.

2. The electric power generation system according to claim 1, wherein the vehicle is equipped with a secondary battery configured to supply to the internal combustion engine the electric power necessary to perform a start-up of the internal combustion engine, and an electric load consuming the electric power supplied from the secondary battery during the stop of the internal combustion engine, and
    the electric power generation system further comprises fuel supply control means configured to control the supply of the second fuel from the separation means to the fuel cell and to permit the supply of the second fuel from the separation means to the fuel cell on satisfying a given condition,
    wherein the fuel cell is configured to supply the generated electric power to at least one of the secondary battery and the electric load.

3. The electric power generation system according to claim 1, wherein the given condition is a given time period counted from a time at which the internal combustion engine stops.

4. The electric power generation system according to claim 1, wherein the given condition is a state of the stop of the internal combustion engine.

5. The electric power generation system according to claim 2, wherein the given condition is a given time period counted from a time at which the internal combustion engine stops.

6. The electric power generation system according to claim 2, wherein the given condition is a state of the stop of the internal combustion engine.

7. The electric power generation system according to claim 1, wherein the separation means comprises a selection permeable membrane for extracting selectively the second fuel to be used in the fuel cell from the first fuel.

8. The electric power generation system according to claim 2, wherein the separation means comprises a selection permeable membrane for extracting selectively the second fuel to be used in the fuel cell from the first fuel.

9. The electric power generation system according to claim 1, wherein
    a rate in volume between the entire of the separation means and the funnel part is not more than a rate in volume between the first fuel and the second fuel.

10. The electric power generation system according to claim 2, wherein
    the fuel cell comprises a plurality of unit fuel cells electrically connected in series.

11. The electric power generation system according to claim 2, further comprising a voltage conversion means configured to boost the electric power generated in the fuel cell.

12. The electric power generation system according to claim 11, wherein the voltage conversion means comprises a plurality of booster circuits.

13. The electric power generation system according to claim 11, wherein on receiving the electric power supplied from the secondary battery the voltage conversion means operates.

14. The electric power generation system according to claim 1, wherein the first fuel is ethanol mixed gasoline composed of ethanol of a given volume and gasoline.

15. The electric power generation system according to claim 1, further comprising supplemental fuel supply means configured to store the second fuel and supply the second fuel directly to the fuel cell.

* * * * *